Oct. 15, 1957  A. SOULET  2,809,482
VALVE SEAT GRINDER
Filed April 12, 1954
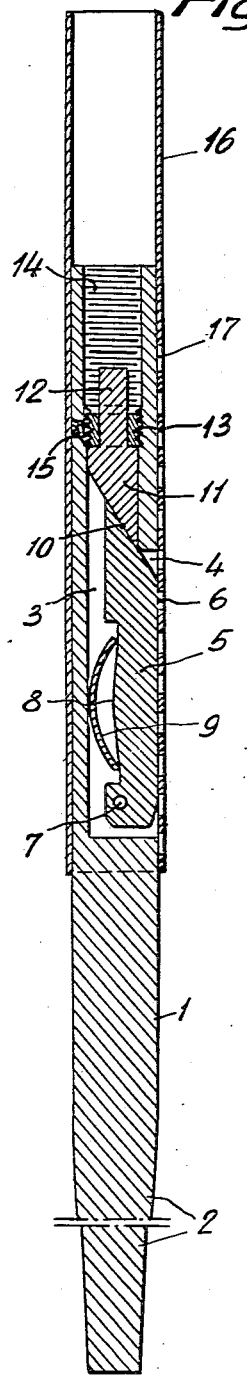
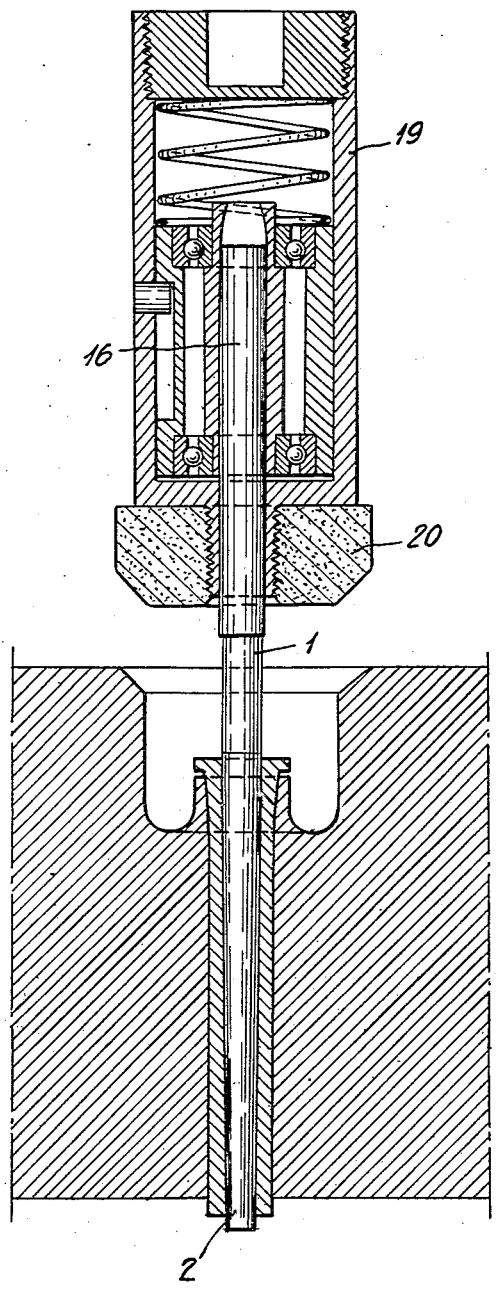

United States Patent Office 2,809,482
Patented Oct. 15, 1957

2,809,482

VALVE SEAT GRINDER

Armand Soulet, Realmont, France

Application April 12, 1954, Serial No. 422,557

Claims priority, application France April 10, 1953

3 Claims. (Cl. 51—241)

In the grinding of valve seats, grindstone carriers are used which are constituted by a sleeve carrying the actual grindstone and suitably driven into rotation, said sleeve being guided coaxially with the seat by a rod engaging an opening of the valve, said rod forming the actual guide for the grindstone carrier.

In the embodiments of such guides proposed hitherto, the guide of the grindstone is constituted by a single member including a conical section cooperating with an expansible clamp fitted in the valve opening and a cylindrical body over which is mounted the sleeve of the grindstone carrier. These guides should be provided with conical sections having different diameters according to the diameter of the valve openings however the openings in the valves should lie at a varying distance from the seat of the valve, which leads to varying operative lengths of the guide. The adaptation to different diameters of valve openings for the valve stems may be obtained readily by modifying the thickness of the clamps.

My invention has for its object an embodiment of such a grindstone carrier adapted to comply with the characteristic features of the corresponding engines so as to allow adjusting the height of the guide body in accordance with the location of the valve seat with reference to the stem opening in the valve.

The guide of the grindstone carrier according to my invention is characterized chiefly by a guiding rod having a frustoconical end and over which is fitted a sliding cylindrical guiding sleeve, while keying means allow locking the sliding sleeve in different longitudinal locations with reference to the guiding rod.

According to an auxiliary feature of my invention, the locking of the sleeve in position with reference to the guiding rod is obtained by a series of ports provided at different heights in the wall of said sleeve and by a member rockably mounted inside the cylindrical rod and carrying a stud engaging elastically a selected port of said series to lock in position the sleeve and the rod with reference to each other.

To make the operation of the stud easier and to allow an adjustment of the sleeve vertically inside the valve opening, the stud-carrying member is rockably carried by the wall of a chamber formed by the guiding rod, the rocking being performed round an axis perpendicular to the axis of said rod while said member is provided at its end opposed to said axis with a sloping plane cooperating with a wedge slidingly engaging a cylindrical chamber forming an extension of the first mentioned chamber inside the guiding rod, said cylindrical chamber opening into the upper end of the guiding rod so as to allow the introduction of a control rod inside said chamber to urge inwardly said wedge to make it act on the slope and cause thereby the stud to collapse inside the guiding rod against the action of yielding means.

Further novel features of the grindstone carrier guide according to my invention will appear in the reading of the following description of a preferred embodiment thereof, illustrated in accompanying drawings in which:

Fig. 1 illustrates the grindstone carrier guide in longitudinal sectional view.

Fig. 2 is a partial sectional view of the said guide during use with the grindstone carrier.

The grindstone carrier is guided by a tubular rod 1 including a solid terminal frustoconical part 2 which serves for securing said rod inside the guiding opening provided in the valve, said part 2 being held in position through the agency of a clamp of a conventional type the diameter of which corresponds to the diameter of the guiding opening in the valve.

The upper end of the tubular rod 1 forms a chamber 3 connected with the outside of the tube through an elongated lateral port 4. Inside said chamber 3 is mounted in register with the port 4 a member 5 carrying a laterally projecting stud 6, said member 5 being pivotally secured to the inside of the tubular rod 1 by a pivot 7 perpendicular to the axis of the rod while its surface opposed to that carrying the stud 6 is recessed at 8 so as to form a housing for a spring blade 9 bearing against the cooperating inner surface of the chamber 3, said spring urging the member 5 outwardly to make the stud 6 engage a selected perforation 17 of a series of perforations formed in a sleeve 16 to be described hereinafter.

The outer end of the member 5 forms at 10 a slope adapted to cooperate with a wedge 11 slidingly fitted inside the chamber 3. Said wedge 11 is provided with a tail-piece 12 extending through a threaded ring 13 screwed into the outer tapped open section 14 of the chamber 3, said ring 13 being held in position by a set screw 15. The tail-piece 12 on the wedge 11 projects, as illustrated in the drawing, above the threaded ring 13.

Over the cylindrical part of the tubular rod 1 is fitted a cylindrical sleeve 16, said sleeve sliding with slight friction over the rod. Said sleeve carries along a generating line a series of perforations 17 registering with the elongated port 4 and the axial length of each of which is equal to the axial length of the stud 6 on the member 5 while the peripheral development of said perforations is larger than the peripheral development of said stud so as to further the positioning of said stud in one of said perforations.

The guide for a grindstone carrier of the type illustrated in the drawing is adapted for use in the following manner:

A conventional clamp is first positioned, said clamp being selected in accordance with the diameter of the passage formed in the valve, and then the conical end 2 of the tubular rod is urged inside said clamp so that said rod is wedged in a predetermined position. The height of the sleeve 16 forming the actual guide is then adjusted with reference to the location of the valve seat.

To perform said adjustment of the sleeve, I engage a small diameter rod or the like instrument inside the threaded section 14 of the chamber 3 so as to exert a pressure on the end of the tail piece 12 of the wedge 11, said wedge cooperating, as it is depressed, with the slope 10 on the member 5; the latter is thus caused to rock round its pivot 7 in a direction compressing the spring 9; the stud 6 is thus released with reference to the perforation 17 in the sleeve 16 engaged by it and consequently the sleeve 16 is free to slide over the rod 1. I then provide for the actual adjustment of the sleeve 16 longitudinally of the rod 1 and remove the control rod or instrument out of the outer end of the chamber 3 so that the spring 9 may expand and make the member 5 urge outwardly the wedge 11; the stud 6 engages then the perforation 17 facing it whereby the guiding sleeve 16 is keyed in the desired adjusted position.

In Fig. 2 said grindstone carrier guide is shown placed in the guiding opening 18 of a valve seat. The grindstone carrier 19 e. g. of the type described in my copending U. S. patent application, Ser. No. 352,298, filed May 1, 1953, is engaged on said guide the cylindrical sleeve 16 of which has been placed in a position such as the grindstone 20 is in a right position to cooperate with the valve seat.

The above embodiment has been disclosed obviously only by way of example and is capable of various modifications within the scope of accompanying claims.

What I claim is:

1. A guide for grindstone carriers of valve seat grinders, comprising a longitudinally slotted rod terminating with a frusto conical end, adapted to be fitted in the valve opening, a cylindrical sleeve mounted over said rod and adapted to engage the grindstone carrier, said sleeve being provided with a series of ports distributed longitudinally of said sleeve along a generating line thereof facing the slot, a member pivotally mounted inside the rod round an axis perpendicular to the plane containing the axis of the rod and the slot, a stud rigid with said member and adapted to engage selectively one of the perforations through the slot, elastic means inserted in the rod between the wall of last mentioned member opposed to the stud and the cooperating inner wall section of the rod and adapted to urge the stud into selective engagement with one of the perforations in the sleeve to lock said sleeve in a predetermined location.

2. A guide for grindstone carriers of valve seat grinders, comprising a longitudinally slotted rod terminating with a frusto conical end, adapted to be fitted in the valve opening, a cylindrical sleeve mounted over said rod and adapted to engage the grindstone carrier, said sleeve being provided with a series of ports distributed longitudinally of said sleeve along a generating line thereof facing the slot, a member pivotally mounted inside the rod round an axis perpendicular to the plane containing the axis of the rod and the slot, said member being provided at its outer end with a sloping plane parallel with its pivot, a stud rigid with said member and adapted to engage selectively one of the perforations through the slot, elastic means inserted in the rod between the wall of said last mentioned member opposed to the stud and the cooperating inner wall section of the rod and adapted to urge the rod into selective engagement with one of the perforations in the sleeve to lock said sleeve in a predetermined location, a wedge slidingly fitted inside the rod and the inner surface of which engages the outer sloping surface of the pivoting member, said wedge being adapted when depressed inwardly to act on the sloping surface of the pivoting member to make the latter pivot and recede away from the perforations in antagonism with the action of the elastic means.

3. A guide for a grindstone carrier of a valve seat grinder, comprising a rod having a frusto-conical end portion for insertion in a valve opening and having an extension normally positioned above the valve seat, a sleeve for said extension adapted to engage the grindstone carrier and having a plurality of perforations longitudinally spaced on a side thereof, a stud pivotally associated with said extension and engageable in any one of said perforations for locking the said sleeve in a predetermined position relative to the rod and relative to the valve seat.

References Cited in the file of this patent

UNITED STATES PATENTS

| | | |
|---|---|---|
| 1,760,493 | Hall | May 27, 1930 |
| 1,975,904 | Ramey et al. | Oct. 9, 1934 |
| 2,446,787 | Reetz | Aug. 10, 1948 |